United States Patent
Tokudi et al.

(10) Patent No.: US 10,386,871 B2
(45) Date of Patent: Aug. 20, 2019

(54) AIR CONDITIONER WITH INDOOR UNITS AND OUTDOOR UNITS

(71) Applicant: Johnson Controls—Hitachi Air Conditioning Technology (Hong Kong) Limited, Hong Kong (CN)

(72) Inventors: Mikihito Tokudi, Tokyo (JP); Kazuhiko Tani, Tokyo (JP); Yoshiyuki Akiyama, Tokyo (JP); Masami Inaba, Tokyo (JP); Takafumi Ota, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 15/562,506

(22) PCT Filed: Mar. 29, 2016

(86) PCT No.: PCT/JP2016/060096
§ 371 (c)(1),
(2) Date: Sep. 28, 2017

(87) PCT Pub. No.: WO2016/158938
PCT Pub. Date: Oct. 6, 2016

(65) Prior Publication Data
US 2018/0095483 A1    Apr. 5, 2018

(30) Foreign Application Priority Data
Apr. 3, 2015    (JP) .................. 2015-076506

(51) Int. Cl.
| F25B 6/02 | (2006.01) |
| F24F 11/62 | (2018.01) |
| F24F 11/80 | (2018.01) |
| F24F 11/89 | (2018.01) |
| F25B 13/00 | (2006.01) |

(Continued)

(52) U.S. Cl.
CPC .......... *G05D 23/1934* (2013.01); *F24F 11/62* (2018.01); *F24F 11/80* (2018.01);
(Continued)

(58) Field of Classification Search
CPC ..... G05D 23/1934; G05D 23/24; F24F 11/62; F24F 2140/20; F24F 11/80; F24F 11/89; F24F 2110/10; F25B 2600/2513
See application file for complete search history.

(56) References Cited

U.S. PATENT DOCUMENTS

| 4,644,756 A | 2/1987 | Sugimoto et al. |
| 8,522,568 B2 * | 9/2013 | Okamoto ................ F25B 9/008 62/199 |

(Continued)

FOREIGN PATENT DOCUMENTS

| JP | 61128069 U | * 8/1986 |
| JP | 2001-147052 A | 5/2001 |
| KR | 10-2010-0123729 A | 11/2010 |

OTHER PUBLICATIONS

Translation of JP61128069.*

(Continued)

*Primary Examiner* — Marc E Norman
*Assistant Examiner* — Nelson J Nieves
(74) *Attorney, Agent, or Firm* — Mattingly & Malur, PC

(57) ABSTRACT

The air conditioner has a configuration such that, in an air-warming operation: the average refrigerant exit temperature, which is obtained by averaging the temperature of the refrigerant exits of indoor heat exchangers 7 in a plurality of indoor units 10, as detected by heat-exchanger-refrigerant-exit temperature probes 34 in the indoor units 10, is determined; the temperature difference between the average refrigerant exit temperature and the refrigerant exit temperatures of the indoor heat exchangers 7 of each of the indoor units 10 is determined; and the degree to which indoor expansion valves 9 of the indoor units 10 are open is controlled such that the determined temperature difference falls within a predetermined temperature difference range.

9 Claims, 3 Drawing Sheets

(51) Int. Cl.
- *F25B 49/02* (2006.01)
- *G05D 23/19* (2006.01)
- *G05D 23/24* (2006.01)
- *F24F 140/20* (2018.01)
- *F24F 110/10* (2018.01)
- *F24F 1/26* (2011.01)

(52) U.S. Cl.
CPC ............... *F24F 11/89* (2018.01); *F25B 6/02* (2013.01); *F25B 13/00* (2013.01); *F25B 49/02* (2013.01); *G05D 23/24* (2013.01); *F24F 1/26* (2013.01); *F24F 2110/10* (2018.01); *F24F 2140/20* (2018.01); *F25B 2313/0233* (2013.01); *F25B 2313/0253* (2013.01); *F25B 2313/02742* (2013.01); *F25B 2313/0314* (2013.01); *F25B 2400/075* (2013.01); *F25B 2600/2513* (2013.01); *F25B 2700/2115* (2013.01); *F25B 2700/21161* (2013.01)

(56) References Cited

U.S. PATENT DOCUMENTS

| | | | |
|---|---|---|---|
| 2011/0000239 A1 | 1/2011 | Okamoto et al. | |
| 2011/0302948 A1* | 12/2011 | Honda | F24D 3/08 62/324.6 |
| 2013/0152613 A1* | 6/2013 | Yamashita | F25B 9/006 62/129 |
| 2015/0135754 A1* | 5/2015 | Nakai | F25B 13/00 62/228.4 |
| 2015/0369498 A1* | 12/2015 | Motomura | F25B 13/00 62/160 |
| 2017/0191706 A1* | 7/2017 | Ogawa | F25B 13/00 |
| 2018/0017271 A1* | 1/2018 | Luo | F24F 11/89 |

OTHER PUBLICATIONS

Korean Office Action received in corresponding Korean Application No. 10-2017-7026775 dated Nov. 20, 2018.
Extended European Search Report received in corresponding European Application No. 16772819.5 dated Oct. 29, 2018.
Japanese Office Action received in corresponding Japanese Application No. 2015-076506 dated Apr. 23, 2019.
Chinese Office Action received in corresponding Chinese Application No. 201680018582.3 dated May 7, 2019.

* cited by examiner

AIR CONDITIONER WITH INDOOR UNITS AND OUTDOOR UNITS

TECHNICAL FIELD

The present invention relates to an air conditioner, specifically, an air conditioner configured to have a plurality of indoor units connected to a single outdoor unit.

BACKGROUND ART

A well-known multiple-type air conditioner is configured to have a plurality of indoor units connected to the single outdoor unit. During warming operation of the multiple-type air conditioner, the indoor expansion valve is used for controlling the heat exchanger outlet supercooling degree as a measure for adjusting each amount of heat exchanged by the respective indoor units. The supercooling degree is obtained as a difference between a saturation temperature derived from the pressure at the discharge side of the compressor and the refrigerant outlet temperature at the outlet of the indoor heat exchanger for the respective indoor units during warming operation. The heat exchanger outlet supercooling degree control is designed to control the opening degree of the indoor expansion valve to a predetermined value so that the above-described supercooling degree is within a suitable range.

In many cases, a plurality of indoor units for the multiple-type air conditioner will be installed on different floors of the building. In the case that values of the height difference and the piping length deviate from the predetermined range relative to the outdoor unit because of different floors on which those indoor units are installed, the refrigerant supercooling degree at each outlet of the indoor heat exchangers for the respective indoor units cannot be appropriately controlled. This may cause the problem of failing to appropriately control each amount of heat exchanged by the respective indoor units.

Japanese Patent Application Laid-Open No. 2013-178058 (Patent Literature 1) discloses the method for solving the above-described failure. The method employs the first temperature sensor for measuring the liquid piping temperature at the outdoor unit side, and the second temperature sensor for measuring the refrigerant outlet temperature of each indoor heat exchanger for the respective indoor units. The difference between temperatures detected by those sensors during warming operation is obtained. The indoor unit having the temperature difference in excess of the predetermined value is controlled so that the valve opening degree of the indoor expansion valve is opened by a given degree. The disclosed method ensures to maintain the amount of heat exchanged by the indoor heat exchanger appropriately irrespective of the installation state (difference in height, piping length, and the like) of the indoor unit of the air conditioner.

CITATION LIST

Patent Literature

PTL 1: Japanese Patent Application Laid-Open No. 2013-178058

SUMMARY OF INVENTION

Technical Problem

In Patent Literature 1 as described above, the difference between the refrigerant outlet temperature of each indoor heat exchanger for the respective indoor units, and the liquid piping temperature of the outdoor unit is controlled to the constant value or smaller. As a result, the following problem occurs even if the above-described temperature difference is equal to or smaller than the constant value.

In the case of variation in the heat exchange capacity or type among the indoor units, the heat transfer area of the indoor heat exchanger and air volume of the blower for the indoor unit may also vary. Accordingly, the disclosed method cannot maintain the heat exchange amount at appropriate level in accordance with the indoor load to the respective indoor units, and the required air conditioning performance. The resultant operation, for example, making the room excessively cold or hot may fail to secure comfort.

It is an object of the present invention to provide the air conditioner configured to appropriately adjust the heat exchange amount in accordance with the indoor load to the respective indoor units, and the required air conditioning performance irrespective of the capacity and type of the indoor unit so as to secure comfort.

Solution to Problem

The present invention is configured to calculate an average value of the refrigerant outlet temperatures of the indoor heat exchangers for the respective indoor units, which are detected by the heat exchanger refrigerant outlet temperature sensors for the indoor units during warming operation, obtain the temperature difference between the average refrigerant outlet temperature and the refrigerant outlet temperature of each indoor heat exchanger for the respective indoor units, and control an opening degree of each indoor expansion valve for the respective indoor units so that the obtained temperature difference is brought to be within the predetermined temperature difference range.

Advantageous Effects of Invention

The present invention provides the air conditioner which secures comfort by adjusting the heat exchange amount in accordance with the indoor load to the respective indoor units, and the required air conditioning performance irrespective of the capacity and type of the indoor unit.

DESCRIPTION OF EMBODIMENT

Figure 1:
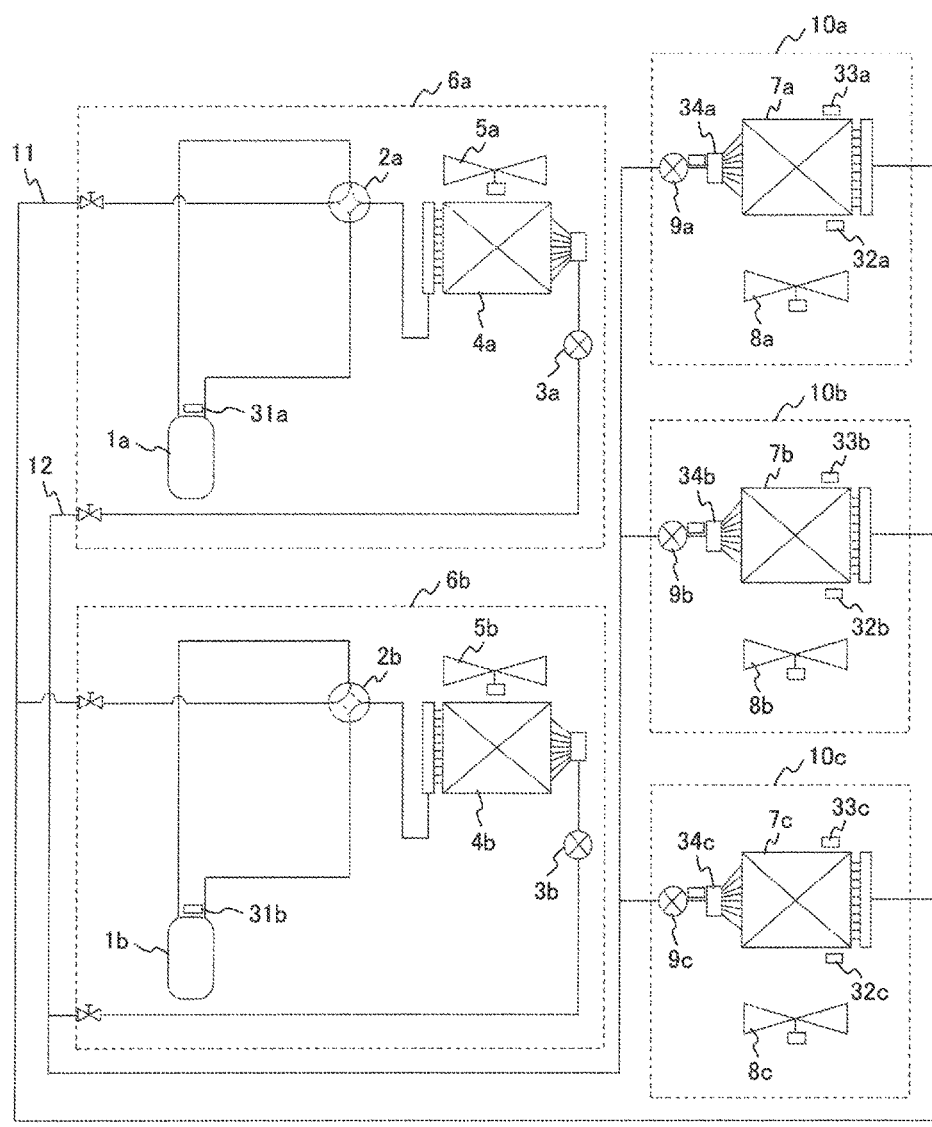
FIG. 1 is a refrigeration cycle system diagram of the multiple-type air conditioner to which the present invention is applied.

An embodiment of the present invention will be described in detail in reference to the drawings. The present invention is not limited to the following embodiment, but may be modified and applied in various forms within the scope of the technical concept of the present invention. Hereinafter, the representative example of the present invention will be described in detail referring to the drawings.

FIG. 1 is a diagram of an exemplary refrigeration cycle system of the air conditioner according to the embodiment. The air conditioner includes two outdoor units 6a, 6b, and three indoor units 10a, 10b, 10c, which are connected via a gas piping 11 and a liquid piping 12. The number of the connectable outdoor units 6 may be set to 1 or more. The number of the connectable indoor units 10 may be set to 2 or more. In other words, the multiple-type air conditioner is configured to have a plurality of indoor units connected to the single outdoor unit.

The outdoor units 6a, 6b include compressors 1a, 1b, four-way valves 2a, 2b, outdoor expansion valves 3a, 3b, outdoor heat exchangers 4a, 4b, outdoor blowers 5a, 5b, and compressor top temperature sensors 31a, 31b each for detecting the temperature at the top of the compressors 1a, 1b, respectively. The above-described components of the outdoor units 6a, 6b have the same structures and the same functions.

The indoor units 10a, 10b, 10c include indoor heat exchangers 7a, 7b, 7c, indoor blowers 8a, 8b, 8c, and indoor expansion valves 9a, 9b, 9c, respectively. The indoor units 10a, 10b, 10c further include indoor draw-in temperature sensors 32a, 32b, 32c for detecting the temperature of air drawn by the respective indoor heat exchangers 7a, 7b, 7c for the indoor units, and indoor blow-off temperature sensors 33a, 33b, 33c for detecting the temperature of air blown from the respective indoor heat exchangers 7a, 7b, 7c. The indoor units 10a, 10b, 10c still further include heat exchanger refrigerant outlet temperature sensors 34a, 34b, 34c for detecting the refrigerant outlet temperature of the respective indoor heat exchangers 7a, 7b, 7c.

During the warming operation of the air conditioner, the high-pressure gas refrigerant compressed by the compressors 1a, 1b is supplied to the indoor heat exchangers 7a, 7b, 7c for the indoor units 10a, 10b, 10c through the four-way valves 2a, 2b, and the gas piping 11. The gas refrigerant is condensed into the liquid refrigerant while heating the indoor air by the indoor heat exchangers 7a, 7b, 7c. Passing through the indoor expansion valves 9a, 9b, 9c, the refrigerant returns to the outdoor units 6a, 6b through the liquid piping 12. Thereafter, passing through the outdoor expansion valves 3a, 3b, the refrigerant evaporates into the gas refrigerant while exchanging heat with outdoor air by the outdoor heat exchangers 4a, 4b. The gas refrigerant returns to the compressors 1a, 1b.

Figure 2:
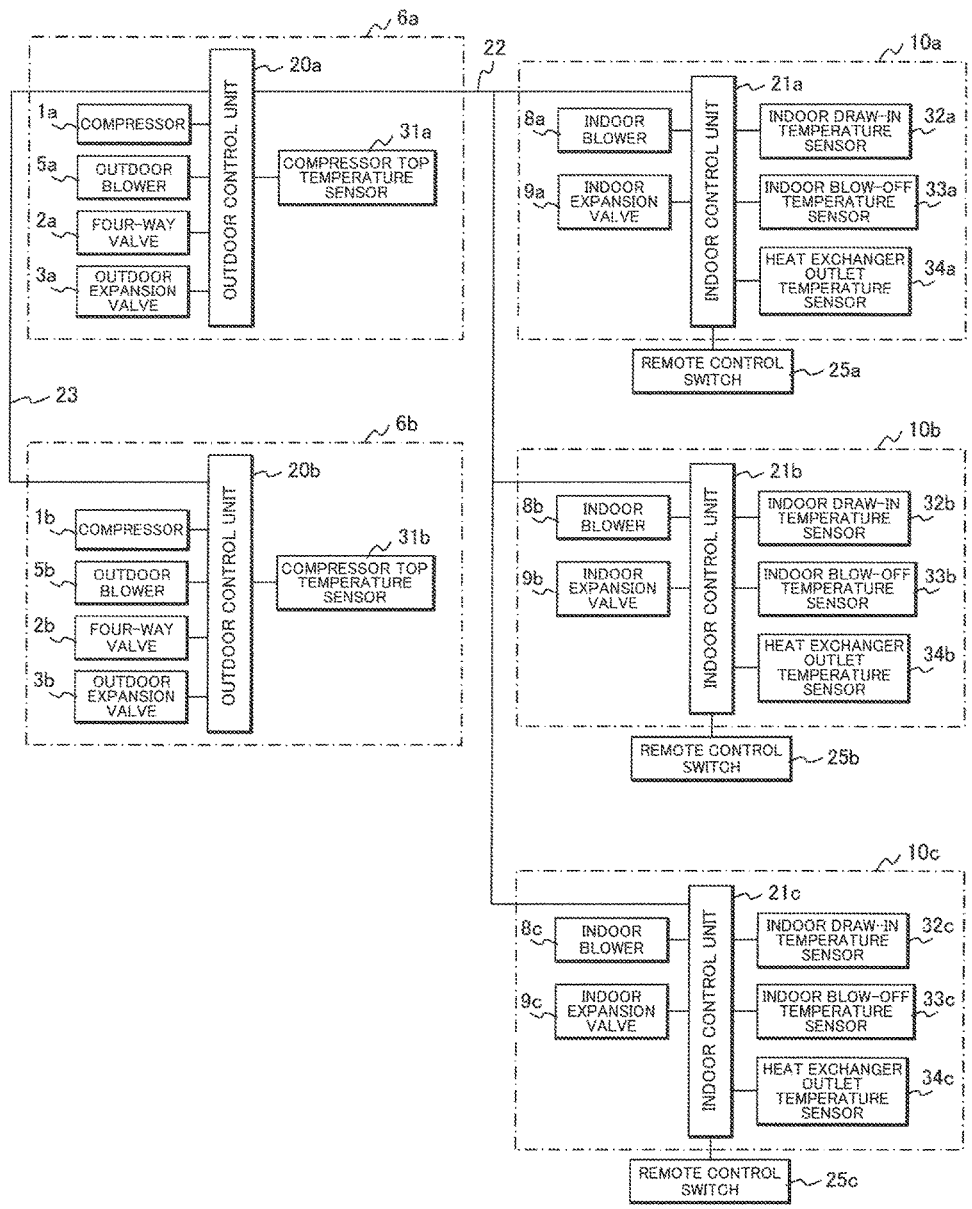
FIG. 2 is a control block diagram for explaining the control block of the air conditioner as shown in FIG. 1.

FIG. 2 is a control block diagram of the air conditioner as shown in FIG. 1. The compressors 1a, 1b, the four-way valves 2a, 2b, the outdoor expansion valves 3a, 3b, and the outdoor blowers 5a, 5b, which are installed in the outdoor units 6a, 6b are controlled by corresponding outdoor control units 20a, 20b, respectively. At this time, the outdoor control units 20a, 20b receive inputs of measurement values of the compressor top temperature sensors 31a, 31b as control information.

The indoor blowers 8a, 8b, 8c, the indoor expansion valves 9a, 9b, 9c, which are installed in the indoor units 10a, 10b, 10c are controlled by indoor control units 21a, 21b, 21c, respectively. The indoor control units 21a, 21b, 21c receive inputs of measurement values detected by the indoor draw-in temperature sensors 32a, 32b, 32c, the indoor blow-off temperature sensors 33a, 33b, 33c, and the heat exchanger refrigerant outlet temperature sensors 34a, 34b, 34c as control information.

The outdoor unit 6a is communicated with the indoor units 10a, 10b, 10c through the respective controllers for those units via a transmission line 22. The outdoor units 6a and 6b are communicated with each other by the respective controllers for those units via a transmission line 23. In the case that a plurality of outdoor units are connected, the outdoor control unit 20a installed in the outdoor unit 6a coupled to the transmission line 22 is expected to perform integrated control of those outdoor units. The outdoor control unit 20b is not expected to perform the integrated control, but to control the respective components of the outdoor unit 6b in accordance with the instruction information from the outdoor control unit 20a. The measurement values of the compressor top temperature sensor 31b as the control information for the outdoor unit 6b will be transmitted to the outdoor control unit 20a via the transmission line 23.

The indoor control units 21a, 21b, 21c control the indoor blowers 8a, 8b, 8c, respectively by activation/stop signals of wirelessly coupled remote control switches 25a, 25b, 25c via infrared rays. The control information such as the temperatures set by the remote control switches 25a, 25b, 25c, and measurement values detected by the indoor draw-in temperature sensors 32a, 32b, 32c, the indoor blow-off temperature sensors 33a, 33b, 33c, and the heat exchanger refrigerant outlet temperature sensors 34a, 34b, 34c will be transmitted to the outdoor control unit 20a.

The outdoor control unit 20a which executes the integrated control of the outdoor units 6a, 6b calculates instruction values including rotation numbers of the compressors 1a, 1b, opening degrees of the outdoor expansion valves 3a, 3b, and the opening degrees of the indoor expansion valves 9a, 9b, 9c, and transmits those instruction values to the outdoor control unit 20b, and the indoor control units 21a, 21b, 21c. In accordance with the instruction values of the outdoor control unit 20a, the outdoor control unit 20b, and the indoor control units 21a, 21b, 21c control the components installed therein, respectively.

The above structured multiple-type air conditioner may have the indoor units 10a, 10b, 10c each with different heat exchange capacity and type. As the resultant heat transfer area of the indoor heat exchangers as well as the air flow volume of the blower of the indoor heat exchangers for the respective indoor units 10a, 10b, 10c become different, the heat exchange amount cannot be maintained appropriately in accordance with the indoor load to the respective indoor units 10a, 10b, 10c, and the required air conditioning performance. This may cause the problem that the respective indoor units 10a, 10b, 10c fail to secure comfort.

The present invention is configured to calculate an average value of the refrigerant outlet temperatures of the indoor heat exchangers for the respective indoor units, which are detected by the heat exchanger refrigerant outlet temperature sensors for the indoor units during warming operation, obtain the temperature difference between the average refrigerant outlet temperature and the refrigerant outlet temperature of each indoor heat exchanger for the respective indoor units, and control an opening degree of each indoor expansion valve for the respective indoor units so that the obtained temperature difference is brought to be within the predetermined temperature difference range.

The thus structured air conditioner is configured to appropriately adjust the heat exchange amount in accordance with the indoor load to the respective indoor units, and the required air conditioning performance irrespective of the capacity and type of the indoor unit.

Figure 3:
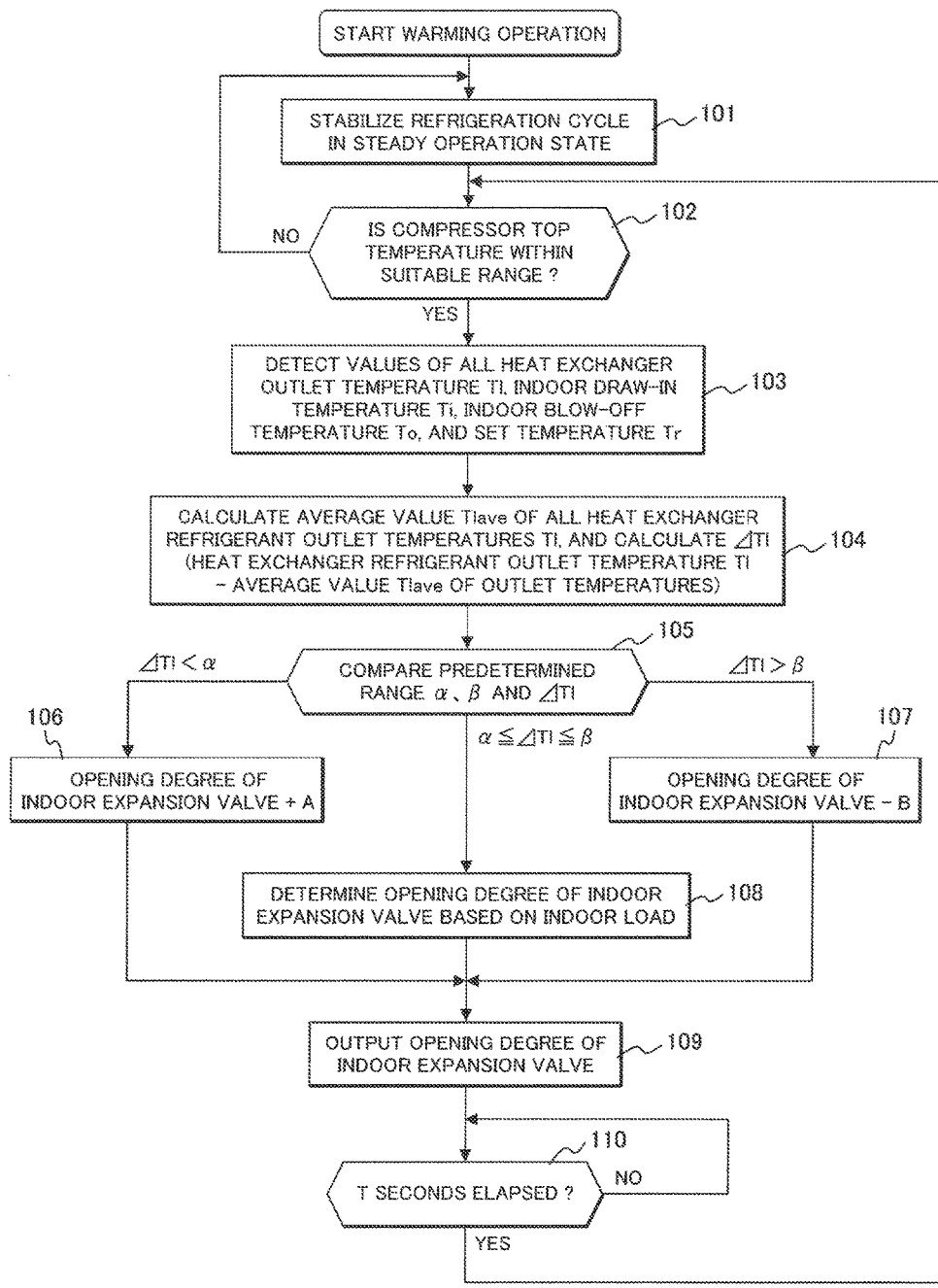
FIG. 3 is a control flowchart for controlling an opening degree of an indoor expansion valve according to an embodiment of the present invention.

The specific control flow of the embodiment will be described referring to the control flowchart as shown in FIG. 3. The control flow is executed by a microcomputer system installed in the outdoor control unit 20a of the outdoor unit 6a. Control signals of the indoor expansion valves 9a, 9b, 9c obtained by the outdoor control unit 20a are transmitted to the indoor control units 21a, 21b, 21c for the indoor units 10a, 10b, 10c, respectively. Based on the transmitted control signals, the indoor control units 21a, 21b, 21c will adjust the opening degrees of the indoor expansion valves 9a, 9b, 9c, respectively.

The control flow for controlling the opening degrees of the indoor expansion valves 9a, 9b, 9c for the indoor units 10a, 10b, 10c, respectively will be described for each control step. Explanations with respect to the control flow will be made on the assumption that the indoor units 10a, 10b, 10c are all in operation states.

<Step 101>

Upon start of the warming operation, the outdoor control unit 20a operates the outdoor unit 6a in a steady state for stabilizing the refrigeration cycle. The steady operation instruction is transmitted to the outdoor control unit 20b for operating the outdoor unit 6b in the steady state. The steady operation is executed to realize the state where the refrigeration cycle is stably operated rather than the transient state where the operation state of the refrigeration cycle fluctuates. After the refrigeration cycle is stabilized, the process proceeds to step 102.

<Step 102>

In step 102, the outdoor control unit 20a judges whether or not the temperature detected by the compressor top temperature sensor 31a for the outdoor unit 6a is within a suitable range for determining the stabilized state of the refrigeration cycle. The temperature detected by the compressor top temperature sensor 31b for the outdoor unit 6b is also transmitted to the outdoor control unit 20a, and subjected to the judgement whether the temperature is within the suitable range. It is also possible to use the temperature detected by the compressor top temperature sensor 31a for the outdoor unit 6a as the representative value. In either case, if it is determined that the temperature detected by the compressor top temperature sensor 31a or 31b is not within the suitable range in step 102, the process returns to step 101 where the similar process is executed with repetition. Meanwhile, if it is determined that the temperature is within the suitable range in step 102, the process proceeds to step 103.

<Step 103>

In step 103, all the indoor control units 21a, 21b, 21c allow the heat exchanger refrigerant outlet temperature sensors 34a, 34b, 34c of the indoor heat exchangers 7a, 7b, 7c to detect refrigerant outlet temperatures TI thereof, allow the indoor draw-in temperature sensors 32a, 32b, 32c to detect indoor draw-in temperatures Ti, allow the indoor blow-off temperature sensors 33a, 33b, 33c to detect indoor blow-off temperatures To, allow detection of set temperatures Tr set by the remote control switches 25a, 25b, 25c, respectively. The detected temperature values are transmitted to the outdoor control unit 20a as the control information. The outdoor control unit 20a is capable of obtaining all the operation states of the respective indoor units 10a, 10b, 10c.

In step 103, all the indoor units 10a, 10b, 10c are operated so as to grasp their operation states. Actually, however, it is sufficient to grasp the operation states of some of those indoor units in operation. After detection of the above-described control information, the process proceeds to step 104.

<Step 104>

In step 104, the outdoor control unit 20a obtains an average value of refrigerant outlet temperature TIave from the refrigerant outlet temperature values TI detected by the heat exchanger refrigerant outlet temperature sensors 34a, 34b, 34c of the indoor heat exchangers 7a, 7b, 7c, respectively. The average value of refrigerant outlet temperature TIave is obtained as an arithmetic mean of the refrigerant outlet temperature TI of the indoor units 10a, 10b, 10c. Accordingly, there may be the case that the refrigerant outlet temperature TI of the specific indoor unit is higher or lower than the average refrigerant outlet temperature TIave. The use of the average refrigerant outlet temperature TIave as a reference value allows adjustment of the heat exchange amounts of the indoor units. It is possible to use any other average value such as a weighted mean instead of the arithmetic mean.

The average refrigerant outlet temperature TIave is obtained by using values of the refrigerant outlet temperature TI detected by the heat exchanger refrigerant outlet temperature sensors for the indoor units in operation as described above. For example, if two out of three indoor units are operated, values of the refrigerant outlet temperatures detected by the two heat exchanger refrigerant outlet temperature sensors are added. The thus added value of the refrigerant outlet temperature is divided by 2 so as to obtain the average refrigerant outlet temperature.

This step calculates the actual temperature difference $\Delta TI$ ($=TI-TIave$) between the refrigerant outlet temperature TI and the average refrigerant outlet temperature TIave obtained in step 104 for each of the indoor units. The temperature difference is used as the temperature difference information with a positive or a negative sign. The temperature difference information with the positive sign indicates that the refrigerant flows at excessively high flow rate through the indoor heat exchanger. The temperature difference information with the negative sign indicates that the refrigerant flows at excessively low flow rate through the indoor heat exchanger. After obtaining the average refrigerant outlet temperature TIave, and the temperature difference $\Delta TI$ in step 104, the process proceeds to step 105.

<Step 105>

In step 105, the actual temperature difference $\Delta TI$ is compared with a target temperature difference range determined by predetermined temperature difference values $\alpha$, $\beta$ (in this case, $\alpha$ is a negative value, and $\beta$ is a positive value. For example, $\alpha$ may be set to $-3$, and $\beta$ may be set to $+3$.). Each value of $\alpha$ and $\beta$ may be either the same or different.

In the embodiment, the opening degrees of the indoor expansion valves 9a, 9b, 9c are controlled. Hereinafter, as those values are controlled in the same manner, the explanation will be made with respect to the process for controlling the indoor expansion valve 9b for the indoor unit 6b as the representative case. In this step, a judgement is made with respect to "$\Delta TI<\alpha$", "$\Delta TI>\beta$", and "$\alpha \leq \Delta TI \leq \beta$", based on which how the indoor expansion valve 9b is controlled will be determined.

In step 105, in the case of "$\Delta TI<\alpha$", it is determined that the opening degree of the indoor expansion valve 9b is too small to be within the target temperature difference range. The process then proceeds to step 106. In the case of "$\Delta TI>\beta$", it is determined that the opening degree of the indoor expansion valve 9b is too large to be within the target temperature difference range. The process then proceeds to step 107. In the case of "$\alpha \leq \Delta TI \leq \beta$", it is determined that the temperature difference is within the target temperature difference range. The process then proceeds to step 108.

<Step 106>

In step 106, as it has been determined that the opening degree of the indoor expansion valve 9b is too small to be within the target temperature difference range, the correction operation is executed by adding a predetermined amount A to the current opening degree of the indoor expansion valve 9b for larger opening degree. The process then proceeds to step 109.

<Step 107>

In step 107, as it has been determined that the opening degree of the indoor expansion valve 9b is too large to be within the target temperature difference range, the correction operation is executed by subtracting the current opening degree of the indoor expansion valve 9b by a predetermined amount B for smaller opening degree. The process then proceeds to step 109.

<Step 108>

In step 108, as the opening degree of the indoor expansion valve 9b is within the target temperature difference range, the correction operation is executed with respect to the opening degree of the indoor expansion valve 9b based on the indoor load. The process proceeds to step 109.

Explanations will be made with respect to methods of calculating the opening degree of the indoor expansion valve 9b based on the indoor load in step 108 before the process proceeds to step 109.

(1) In step 108, it is possible to determine the opening degree of the indoor expansion valve 9b based on the temperature difference between the indoor draw-in temperature Ti detected by the indoor draw-in temperature sensor 32b and the set temperature Tr set by the remote control switch 25b. This allows appropriate adjustment of the air conditioning performance of the indoor unit 10b by controlling the opening degree of the indoor expansion valve 9b for the appropriate temperature difference.

(2) In step 108, it is also possible to determine the opening degree of the indoor expansion valve 9b based on the temperature difference between the indoor draw-in temperature Ti detected by the indoor draw-in temperature sensor 32b and the indoor blow-off temperature To detected by the indoor blow-off temperature sensor 33b. This allows appropriate adjustment of the air conditioning performance of the indoor unit 10b by controlling the opening degree of the indoor expansion valve 9b for the appropriate temperature difference.

(3) In step 108, it is possible to determine the opening degree of the indoor expansion valve 9b based on the temperature difference between the set temperature Tr set by the remote control switch 25b and the indoor blow-off temperature To detected by the indoor blow-off temperature sensor 33b. This allows appropriate adjustment of the air conditioning performance of the indoor unit 10b by controlling the opening degree of the indoor expansion valve 9b for the appropriate temperature difference. This allows appropriate adjustment of the air conditioning performance of the indoor unit configured to draw outdoor air for adjusting the air conditioning performance in reference to the relationship between the set temperature Tr and the indoor blow-off temperature To.

(4) In step 108, it is possible to control the opening degree of the indoor expansion valve 9b so that the supercooling degree at the outlet of the heat exchanger for the indoor unit 10b reaches the target value of the heat exchanger outlet supercooling degree determined by the temperature difference between the indoor draw-in temperature Ti and the set temperature Tr. Compared with the case for controlling the opening degree of the indoor expansion valve based on the temperature difference between the indoor draw-in temperature Ti and the set temperature Tr, the responsiveness of the indoor expansion valve 9b to the indoor load change may be made higher, reducing the time period required for optimizing the heat exchange amount of the indoor unit.

(5) In step 108, it is possible to control the opening degree of the indoor expansion valve 9b so that the supercooling degree at the outlet of the heat exchanger for the indoor unit 10b reaches the target value of the heat exchanger outlet supercoiling degree determined by the temperature difference between the indoor draw-in temperature Ti and the indoor blow-off temperature To. Compared with the case for controlling the opening degree of the indoor expansion valve 9b based on the temperature difference between the indoor draw-in temperature Ti and the indoor blow-off temperature To, the responsiveness of the indoor expansion valve 9b to the change in the performance of the indoor unit 10b may be made higher, reducing the time period required for optimizing the heat exchange amount of the indoor unit 10b.

(6) In step 108, it is possible to control the opening degree of the indoor expansion valve 9b so that the supercooling degree at the outlet of the heat exchanger of the indoor unit 10b reaches the target value of the heat exchanger outlet supercooling degree determined by the temperature difference between the set temperature Tr and the indoor blow-off temperature To. In the case of the indoor unit 10b for adjusting the air conditioning performance in reference to the relationship between the set temperature Tr and the indoor blow-off temperature To, compared with the case for controlling the indoor expansion valve 9b based on the temperature difference between the set temperature Tr and the indoor blow-off temperature To, the responsiveness of the indoor expansion valve 9b to the change in the indoor unit performance may be made higher, reducing the time period required for optimizing the heat exchange amount of the indoor unit 10b.

By implementing any one of the above-described methods, the correction operation is executed with respect to the opening degree of the indoor expansion valve 9b based on the indoor load. The process then proceeds to step 109.

<Step 109>

After execution of the correction operation of the opening degree of the indoor expansion valve 9b in steps 106, 107, and 108, the process in step 109 is executed. More specifically, the corrected opening degree signal of the indoor expansion valve 9b is output from the outdoor control unit 20a to the indoor control unit 21b, by which the opening degree of the indoor expansion valve 9b is adjusted. After outputting the corrected opening degree signal of the indoor expansion valve 9b to the indoor control unit 21b, the process proceeds to step 110.

<Step 110>

In step 110, it is judged whether or not a predetermined time period (T seconds) has been elapsed. Upon elapse of the predetermined time period, the process returns to step 102 again for executing the above-described process steps repeatedly, functioning as the control cycle.

As described above, the multiple-type air conditioner includes a plurality of indoor units disposed at various locations. In the case that the indoor unit deviates from the predetermined range of specification relative to the outdoor unit because of difference in height or piping length at the installed location, and capacity and type of the indoor unit 10, there may cause the risk of unevenness in the flow rate of the refrigerant among the indoor units.

For example, the indoor unit in which the refrigerant flows at a low flow rate, the heat exchange amount is decreased, thus increasing the supercooling degree (generally, it is expressed as a value obtained by subtracting the refrigerant outlet temperature of the heat exchanger from the refrigerant saturation temperature at the discharge side of the compressor), that is, lowering the refrigerant outlet temperature of the indoor heat exchanger. This may lower the indoor unit performance, resulting in deteriorated comfort.

Referring back to FIG. 3, it is judged whether the refrigerant outlet temperature of the indoor heat exchanger 7b has been lowered in step 105. If the temperature difference ΔTI becomes lower than the predetermined value α, the process proceeds to step 106 where the opening degree of the indoor expansion valve 9b is increased by the amount A. The indoor unit 6b having the opening degree of the indoor expansion valve 9b increased by the amount A increases the refrigerant flow rate through the indoor heat exchanger 7b to increase the heat exchange amount. Accordingly, it is possible to prevent deterioration in performance of the indoor unit 6b, securing the comfort.

Meanwhile, the heat exchange amount of the indoor unit in which the refrigerant flows at the high flow rate increases the heat exchange amount, thus decreasing the supercooling degree of the indoor heat exchanger, that is, raising the refrigerant outlet temperature of the indoor heat exchanger. This may excessively intensify the indoor unit performance, resulting in deteriorated comfort.

Referring back to FIG. 3, it is judged with respect to the refrigerant outlet temperature rise of the indoor heat exchanger 7b in step 105. If the temperature difference ΔTI exceeds the predetermined value β, the process proceeds to step 107 where the opening degree of the indoor expansion valve 9b is decreased by the amount B. In the indoor unit 6b having the opening degree of the indoor expansion valve 9b decreased by the amount B, the refrigerant flow rate through the indoor heat exchanger 7b is decreased to reduce the heat exchange amount. This may optimize the excessive performance of the indoor unit 6b, thus securing the comfort.

As described above, the air conditioner is configured to obtain the temperature difference between the average refrigerant outlet temperature derived from averaging the refrigerant outlet temperatures of the heat exchangers for the respective indoor units in operation, and the refrigerant outlet temperatures of the indoor heat exchangers for the respective indoor units, and control the opening degree of the indoor expansion valve for the respective indoor units so that the temperature difference is brought to be within the predetermined target temperature difference range. This allows the indoor unit deviating from the predetermined target temperature difference range relative to the outdoor unit to appropriately maintain the heat exchange amount by suitably adjusting the opening degree of the indoor expansion valve irrespective of the capacity and type of the indoor unit.

It is possible to determine the amounts A and B for increasing and decreasing the opening degree of the indoor expansion valve based on the temperature difference ΔTI. That is, in the case of the large temperature difference ΔTI, both adjustment amounts A and B are set to large values. Setting of the increase amount A to the large value (increasing the opening degree) allows the refrigerant flow rate through the indoor heat exchanger to be highly increased. This allows quick rise in the refrigerant outlet temperature of the indoor heat exchanger for the indoor unit where the refrigerant outlet temperature of the heat exchanger is decreased. As a result, the temperature difference may be brought to be within the appropriate temperature difference range.

Meanwhile, setting the decrease amount B to a large value (increasing the closing degree) ensures to significantly reduce the refrigerant flow rate in the indoor heat exchanger. This makes it possible to promptly decrease the refrigerant outlet temperature of the indoor unit where the refrigerant outlet temperature has been increased in the indoor heat exchanger. As a result, the temperature difference may be brought to be within the appropriate temperature difference range.

It is advantageous for changing the increase and decrease amounts A and B continuously in response to the magnitude of the temperature difference. Using the large values of the increase and decrease amounts A and B as they are may cause excessive response (hunting) to the operation of the indoor expansion valve. For the purpose of avoiding the above-described failure, it is preferable to reduce the increase and decrease amounts A and B as the temperature difference becomes small.

As described above, the present invention is configured to calculate an average value of the refrigerant outlet temperatures of the indoor heat exchangers for the respective indoor units, which are detected by the heat exchanger refrigerant outlet temperature sensors for the indoor units during warming operation, obtain the temperature difference between the average refrigerant outlet temperature and the refrigerant outlet temperature of each indoor heat exchanger for the respective indoor units, and control an opening degree of each indoor expansion valve for the respective indoor units so that the obtained temperature difference is brought to be within the predetermined temperature difference range. The thus structured air conditioner is configured to appropriately adjust the heat exchange amount in accordance with the indoor load to the respective indoor units, and the required air conditioning performance irrespective of the capacity and type of the indoor unit.

The present invention which is not limited to the aforementioned embodiment includes various kinds of modifications. For example, the aforementioned embodiment has been described in detail for easy understanding of the present invention. Therefore, it is not necessarily limited to be configured to have all the components as described above. It is possible to replace a part of the structure of one embodiment with the structure of another one. The one embodiment may be provided with an additional structure of another one. It is further possible to add, remove, and replace the other structure to, from and with a part of the structure of the embodiments.

REFERENCE SIGNS LIST

1: compressor,
2a, 2b: four-way valve,
3a, 3b: outdoor expansion valve,
4a, 4b: outdoor heat exchanger,
5a, 5b: outdoor blower,
6a, 6b: outdoor unit,
7a, 7b, 7c: indoor heat exchanger,
8a, 8b, 8c: indoor blower,
9a, 9b, 9c: indoor expansion valve,
10a, 10b, 10c: indoor unit,
11: gas piping,
12: liquid piping,
20a, 20b: outdoor control unit,
21a, 21b, 21c: indoor control unit,
22: transmission line (between outdoor unit and indoor unit),
23: transmission line (between outdoor units),
25a, 25b, 25c: remote control switch,
31a, 31b: compressor top temperature sensor,
32a, 32b, 32c: indoor draw-in temperature sensor,
33a, 33b, 33c: indoor blow-off temperature sensor,
34a, 34b, 34c: heat exchanger outlet temperature sensor

The invention claimed is:

1. An air conditioner, comprising:
a plurality of indoor units, each of which includes at least an indoor expansion valve, an indoor heat exchanger, and a heat exchanger refrigerant outlet temperature sensor for detecting a refrigerant outlet temperature of the indoor heat exchanger;
an outdoor unit connected to the indoor units via a liquid piping and a gas piping; and
a controller included in the outdoor unit and connected to each of the plurality of indoor units, the controller configured to:
calculate an average value of the refrigerant outlet temperatures detected by the heat exchanger refrigerant outlet temperature sensors for the indoor units in operation during a warming operation,
obtain a temperature difference between the average refrigerant outlet temperature and each refrigerant outlet temperatures of the indoor heat exchangers for the respective indoor units in operation, and
control respective opening degrees of each of the indoor expansion valves for the respective indoor units in operation so that respective obtained temperature differences are brought to be within a predetermined target temperature difference range, and
in response to a determination that a first temperature difference of the obtained temperature differences is within the target temperature difference range, increase or decrease a first opening degree of a first indoor expansion valve of the at least one indoor expansion valve of a first indoor unit of at least one of the plurality of indoor units that has the first temperature difference within the target temperature difference range, based on a first indoor load in a room where the first indoor unit is installed.

2. The air conditioner according to claim 1, wherein:
the temperature differences obtained are positive or negative, and
wherein the controller is configured to increase or decrease the first opening degree of the first indoor expansion valve based on the positive or negative temperature difference.

3. The air conditioner according to claim 2, wherein the controller is configured to change the first opening degree of the first indoor expansion valve, which is increased or decreased based on a magnitude of the positive or negative temperature difference.

4. The air conditioner according to claim 1, wherein:
at least the first indoor unit includes an indoor draw-in temperature sensor for detecting a temperature of air drawn by the indoor heat exchanger of the first indoor unit, and a remote control switch for setting a set temperature, and
wherein the controller is configured to, in response to a determination that the first temperature difference is within the target temperature difference range, control the first opening degree of the first indoor expansion valve based on a temperature difference between an indoor draw-in temperature detected by the indoor draw-in temperature sensor as the indoor load and the set temperature set by the remote control switch.

5. The air conditioner according to claim 1, wherein:
at least the first indoor unit includes an indoor draw-in temperature sensor for detecting a temperature of air drawn by the indoor heat exchanger of the first indoor unit, and an indoor blow-off temperature sensor for detecting a temperature of air blown from the indoor heat exchanger, and
wherein the controller is configured to, in response to a determination that the first temperature difference is within the target temperature difference range, control the first opening degree of the first indoor expansion valve based on a temperature difference between an indoor draw-in temperature detected by the indoor draw-in temperature sensor as the indoor load, and an indoor blow-off temperature detected by the indoor blow-off temperature sensor.

6. The air conditioner according to claim 1, wherein:
each of the indoor units include an indoor blow-off temperature sensor for detecting a temperature of air blown from the indoor heat exchanger, and a remote control switch for setting a set temperature, and
wherein the controller is configured to, in response to a determination that the first temperature difference is within the target temperature difference range, control the first opening degree of the first indoor expansion valve based on a temperature difference between an indoor blow-off temperature detected by the indoor blow-off temperature sensor of the first indoor unit as the indoor load, and the set temperature set by the remote control switch of the first indoor unit.

7. The air conditioner according to claim 1, wherein:
at least the first indoor unit includes an indoor draw-in temperature sensor for detecting a temperature of air drawn by the indoor heat exchanger, and a remote control switch for setting a set temperature, and
wherein the controller, in response to a determination that the first temperature difference is within the target temperature difference range, controls the first opening degree of the first indoor expansion valve so that a supercooling degree at an outlet of the indoor heat exchanger for the first indoor unit as the indoor load reaches a target supercooling degree at the outlet of the indoor heat exchanger, which is determined by a temperature difference between an indoor draw-in temperature detected by the indoor draw-in temperature sensor and the set temperature set by the remote control switch.

8. The air conditioner according to claim 1, wherein:
at least the first indoor unit includes an indoor draw-in temperature sensor for detecting a temperature of air drawn by the indoor heat exchanger, and an indoor blow-off temperature sensor for detecting a temperature of air blown from the indoor heat exchanger, and
wherein the controller is configured to, in response to a determination that the first temperature difference is within the target temperature difference range, control the opening degree of the first indoor expansion valve so that a supercooling degree at an outlet of the first indoor heat exchanger for the first indoor unit as the indoor load reaches a target supercooling degree at the outlet of the indoor heat exchanger, which is determined by a temperature difference between an indoor draw-in temperature detected by the indoor draw-in temperature sensor, and an indoor blow-off temperature detected by the indoor blow-off temperature sensor.

9. The air conditioner according to claim 1, wherein:
at least the first indoor unit includes an indoor blow-off temperature sensor for detecting a temperature of air blown from the indoor heat exchanger, and a remote control switch for setting a set temperature, and wherein the controller is configured to, in response to a determination that the first temperature difference is within the target temperature difference range, control the first opening degree of the first indoor expansion valve so that a supercooling degree at an outlet of the indoor heat exchanger for the first indoor unit as the indoor load reaches a target supercooling degree at the outlet of the indoor heat exchanger, which is determined by a temperature difference between an indoor blow-off temperature detected by the indoor blow-off temperature sensor and the set temperature set by the remote control switch.

\* \* \* \* \*